United States Patent [19]
Thompson

[11] Patent Number: 4,632,944
[45] Date of Patent: Dec. 30, 1986

[54] POLYMERIZABLE FLUID

[75] Inventor: William H. Thompson, Dublin, Ireland

[73] Assignee: Loctite Corporation, Newington, Conn.

[21] Appl. No.: 434,538

[22] Filed: Oct. 15, 1982

[30] Foreign Application Priority Data

Oct. 15, 1981 [GB] United Kingdom ................. 8131136

[51] Int. Cl.$^4$ ........................... B05D 3/06; C08F 2/50
[52] U.S. Cl. ....................................... 522/11; 522/13; 522/28; 522/71; 522/79; 522/81; 522/83; 522/107; 522/108; 522/181; 522/182; 522/183; 411/258; 427/54.1; 523/176; 523/211
[58] Field of Search ..................................... 204/159.23

[56] References Cited

U.S. PATENT DOCUMENTS

| | | | |
|---|---|---|---|
| 3,709,866 | 1/1973 | Waller | 204/159.23 |
| 3,931,678 | 1/1976 | O'Sullivan et al. | 204/159.23 |
| 3,937,855 | 2/1976 | Gruenwald | 427/54.1 |
| 3,968,305 | 7/1976 | Oshima et al. | 204/159.23 |
| 4,025,407 | 5/1977 | Chang et al. | 204/159.16 |
| 4,092,443 | 5/1978 | Green | 204/159.23 |
| 4,097,994 | 7/1978 | Reaville et al. | 204/159.16 |
| 4,170,663 | 10/1979 | Hahn et al. | 204/159.19 |
| 4,222,835 | 9/1980 | Dixon | 204/159.16 |
| 4,309,334 | 1/1982 | Valitsky | 521/55 |
| 4,309,526 | 1/1982 | Baccei | 204/159.22 |
| 4,325,985 | 4/1982 | Wallace | 427/54.1 |
| 4,387,190 | 6/1983 | Feely | 204/159.19 |
| 4,483,912 | 11/1984 | Sanders | 430/138 |

FOREIGN PATENT DOCUMENTS 119970 7/1982 Japan.

OTHER PUBLICATIONS 82-73549E/35 Derwent Abstract.
91-39109D/22 Derwent Abstract.
Kaspar "Light Sensitive Systems" 1965 John Wiley & Sons p. 170.

Primary Examiner—John C. Bleutge
Assistant Examiner—A. H. Koeckert
Attorney, Agent, or Firm—Cushman, Darby & Cushman

[57] ABSTRACT

A polymerizable fluid for sealing and locking engineering parts contains components which allow 2 mechanisms of polymerization, the first of the mechanisms being initiatable by radiation such as ultraviolet light, and an opacifier such as a powder dispersed in the fluid, the opacifier rendering the fluid opaque to the radiation. A coating of the fluid is applied to one of the engineering parts and the coating is exposed to the radiation which initiates the first of said polymerization mechanisms, so that polymerization occurs only in a surface layer of the coating to form a dry tack free crust thereon. Due to the presence of the opacifier, the radiation is obstructed from passing beyond the surface layer and the subcutaneous fluid is unaffected by the radiation. The second polymerization mechanism, suitably a free radical addition polymerization of known type, is initiatable when two engineering parts are assembled together.

12 Claims, 2 Drawing Figures

POLYMERIZABLE FLUID

BACKGROUND OF THE INVENTION

1. Field of the Invention

This invention relates to a polymerisable fluid for the sealing and locking of engineering parts, particularly interfitting parts such as fasteners, more especially threaded fasteners such as nuts, bolts, screws, threaded nails and the like, or parts such as pipe joints which may be threaded or slip-fitted. It may be used in any circumstances of assembly of engineering parts where close tolerances obtain between adjacent surfaces of the parts.

2. Description of the Prior Art

The use of liquid or semi-liquid polymerisable substances for the purpose of sealing and locking interfitting parts is well known in the art. U.S. Pat. No. 3,489,599, describes an anaerobically polymerisable composition (particularly an acrylate monomer and a peroxide initiator) which is applied to at least one of the parts and which is covered with an envelope of oxygen-permeable material which is non-tacky. When the parts are assembled, oxygen is excluded and polymerisation occurs to seal the mating surfaces. U.S. Pat. No. 3,746,068 describes a pressure-activatable system based on encapsulated resin (particularly an epoxy resin) and a non-volatile curative therefor (preferably an amine), the capsules and curative being contained in a fluid binder which holds the system on an abutment surface of a mechanical fastener. The mixture dries to a tack-free film upon evaporation of solvent from the binder. Reference is also directed to U.S. Pat. No. 3,814,156 and British Patent 1,422,439.

U.S. Pat. No 4,059,136 describes a thread locking system in which two physically separated deposits of fluid components of a polymerisable composition are applied to the threaded part, a reaction occurs at the contacting edges of the deposits to form a barrier which limits further reaction, and a cover coat is applied over both deposits, the cover coat being adapted to transform into a thin rupturable non-tacky film. When the threaded part is engaged with a mating body, the two deposits are intermixed and react to form a solid locking material.

Early locking compositions were applied in liquid form shortly before assembly of the interfitting parts. However, in order to facilitate the high rates of assembly of the mass-production engineering industries such as the automotive industry, pre-applied coatings are now preferred. These coatings are deposited on the fastener as dry to touch coatings in which polymerisable fluids are incorporated, one of the components generally being encapsulated and a binder being present to hold the polymerisable components in position on the part. The action of assembly causes fracture of the microcapsules and mixing of the components. This causes polymerisation of the fluids and locking and sealing of the assembly.

Although these pre-applied coatings have a number of advantages over liquid products in ease and speed of assembly, they have a number of shortcomings:

(a) The binder used is frequently not an integral part of the final polymerised film and the resultant strength is not as great as that of a film from the monomer alone, such as is obtained from a polymerisable liquid product, and very high strengths are not achievable.

(b) The film causes the friction of assembly to be increased, thus adversely affecting the torque/tension relationship so that the tension achievable in a fastener for a given torque is less than that achievable for an uncoated fastener.

(c) Stripping of the film can occur, particularly on some surfaces with ill fitting or burred nuts with consequent failure of the locking system.

(d) The coating is either deposited from organic solvent which is expensive and wasteful in operation and is normally a health and safety hazard, or is deposited from aqueous emulsion, but in this event ovens for drying are necessary which are expensive in capital requirements and in energy of operation.

It is an object of the present invention to provide a system of application of pre-applied coatings for sealing and locking threaded fasteners and other close fitting parts which does not suffer from the above-mentioned faults, and which gives coatings which are reliable and effective on a wide range of surfaces.

U.S. Pat. No. 4,325,985, issued after the priority date of the present application, describes a method in which a fluid material including an fluid resin is deposited on a threaded part and immediately thereafter, while the material is still fluid, a separate fluid film-forming cover coat is applied thereover and the cover coat is immediately transformed into a thin, solid, dry non-tacky film by brief exposure to radiation, such as ultra-violet radiation. The radiation-curable cover coat is cured through its depth and it does not participate in the subsequent cure on assembly of the fastener. The two systems involved in this method are two fluids and are physically separate. Therefore the procedure for coating the threaded member involves two steps.

It is a further object of the present invention to provide a system in which a single polymerisable fluid contains components adapted to form a dry coating thereon but to seal and lock one mechanical part to another upon assembly of the parts.

SUMMARY OF THE INVENTION

The invention provides a polymerisable fluid for sealing and locking engineering parts, wherein the polymerisable fluid contains components which allow two mechanisms of polymerisation, the first of the mechanisms being initiatable by radiation, and also contains an opacifier which renders the fluid substantially opaque to the said radiation. The second mechanism is suitably free radical addition polymerization and is initiatable when two engineering parts are assembled together, for example a system of the known type having one or more of the active ingredients isolated e.g. in a rupturable film or coat or in microcapsules dispersed in the polymerisable fluid, or an anaerobic system, in which case the active ingredients need not be microencapsulated.

According to one aspect of the present invention, a method of providing sealing and locking material on engineering parts comprises applying to at least one of said parts a coating of the polymerisable fluid defined above having the opacifier therein and exposing said coating to the radiation which initiates the first of said polymerisation mechanisms, so that polymerisation occurs only in a surface layer of the coating to form a dry tack-free crust thereon but the polymerisable fluid beneath the crust is substantially unaffected by the radiation.

In the description which follows, the system initiatable by radiation will be referred to as a photoinitiation system. It will be understood that the radiation used is normally ultra-violet or visible radiation (light) but the invention is not limited thereto and can include electron beam radiation. Preferably the radiation wavelength is between 200 and 800 millimicrons, particularly 250 and 450 millimicrons. The opacifier is a constituent or additive in the fluid which has the capacity to obstruct by absorbtion or reflection the transmission of radiant energy. Due to the presence of the opacifier, the radiation is extinguished just below the surface of the coating and the polymerisable fluid underneath the crust is therefore substantially unaffected by the radiation and remains in a fluid state.

The surface crust thickness can be varied by variation in the concentration of opacifier up to a level at which the extinction coefficient is increased to such an extent that the penetration of the incident radiation is dramatically reduced and is virtually constant at 0.8 mils (0.02 mm) and independent of u.v. flux and exposure time. This allows a large tolerance in exposure conditions in commercial practice.

Because polymerisation of most acrylic and polyester systems is subject to oxygen inhibition, the surface may display some tackiness after curing in ambient conditions. The degree of tackiness is a function of the polymerisable fluid used, acrylates are better in this regard than methacrylates. It is also a function of the photoinitiator used, anthraquinone and benzophenone derivatives are less sensitive to surface inhibition than acetophenone and benzoin derivatives. (See William C. Perkins - Radiation Curing, Vol. 7, Aug. 1980, p.4). The method normally used to obviate surface tack is the use of an inert gas such as nitrogen or carbon dioxide to blanket the surface during curing. I have found the use of these inert gases to be of great advantage in light efficiency and exposure time in the coating of fasteners.

Preferably, both the first and second polymerisation mechanisms are applicable to the monomer or mixture of monomers in the polymerisable fluid. The second polymerisation mechanism may be a free radical addition polymerisation as obtained by peroxides or hydroperoxides with acrylic or polyester systems; the mechanism may be anaerobic, or a catalyst e.g. the initiator or activator may be isolated from the remainder of the fluid, for example in microcapsules or in a preapplied base coat which will be ruptured to mix the components upon assembly of the mechanical parts. A pre-applied base coat may be pre-cured by irradiation, and if desired an opacifier may be included in the base coating composition so that only a surface layer of the base coat is cured by irradiation. However it is preferred to use a unitary coating which can be applied in a single process step.

Two types of monomer system may be used together in the polymerisable fluid, the polymerization of one type being initiated by photoinitiation and subsequent free radical polymerisation and the polymerisation of the other type being initiated by an auxiliary mechanism such as ring-opening or condensation. For example the main type could be acrylic and the other type could be epoxy or urethane; in either case one of the active ingredients for the auxiliary polymerisation mechanism would be isolated prior to assembly. The auxiliary type of monomer is not necessary for operation of the invention but may be present as a modifier.

The opacifier may be a soluble material which is an ultraviolet light absorber such as 2-hydroxy-4-methoxybenzophenone or other commercially available materials such as are used for absorption of ultraviolet light in the protection of polymeric materials from degradation by sunlight. However it is preferably a finely divided insoluble solid particularly a pigment or metal powder or flake or a finely divided inorganic or organic solid which because of its fine state of division is impermeable to ultraviolet light. The opacifier may be dispersed throughout the polymerisable fluid or may form a layer close to the surface of the fluid when it is applied to an engineering part.

Preferably the opacifier is dispersed throughout the fluid by hand stirring or by mechanical stirring or by rolling or shaking, for example. The opacifier may suitable be present in an amount of 0.5–50% by weight, preferably 1–25% by weight, particularly 5–10% by weight, based on the total weight of the fluid. The amount of opacifier used will vary depending upon the extinction coefficient of the particular opacifier. For example, in the case of metal flakes or carbon black, very small quantities will suffice whereas in the case of calcium carbonate, substantial quantities will be required. The photoinitiator may suitable be present in an amount of 0.5–5% by weight, particularly 2–3% by weight, based on the weight of the fluid.

The fluid may contain other components necessary for the efficacy of the system or systems, such as initiators, or activators, and may also advantageously contain fillers, as known in the prior art.

The polymerisable fluid may suitably be applied to the fastener or othe engineering part by dipping, brushing, rolling or spraying and then exposed to ultra violet or visible radiation either in the presence of air or blanketed by an inert gas, when the surface layer polymerizes to a solid crust but the deeper layers which are protected from the radiation by the dispersed opacifier remain liquid. On assembly of the fastener or engagement of other engineering parts, the fragile crust is disrupted and the subcutaneous liquid fills the interstitial space and is caused to polymerize by the release of the active ingredient from the contained microcapsules, or by operation of the anaerobic system.

The polymerisable liquid may be a 2-component composition having at least one component microencapsulated or an anaerobically polymerisable compositions as descrivbed in the prior art, for example in U.K. Patent Specification No. 824 677, U.S. Pat. No. 3,046,262 or U.S. Pat. No. 3,489,599 or the modifications described in U.K. Patent Specifications No. 875 985 and 928 307. It may be an acrylic or vinyl system such as an acrylate or methacrylate ester of a monohydric, dihydric, trihydric or polyhydric alcohol such as n-hexanol, ethoxylated bis phenol A, trimethylol propane, or pentaerithritol; a vinyl or allyl ether of such polyols such as pentaerithritol tri allyl ether or a vinyl or allyl ester, or styrene or a substituted styrene. It may include as a modifier or auxiliary polymerisable agent an epoxy or urethane system; or a prepolymer of a low molecular weight urethane or polyester capped with reactive groupings such as acrylate; or a common polyester of a polyol and a di-functional acid such as phthalic or terephthalic, the structure of which is modified by the incorporation of unsaturated acids such as maleic, fumaric, crotonic or itaconic.

It may also be an oligomer or lower molecular weight polymer of commonly used monomers such as acrylates or methacrylates e.g. methyl methacrylate which is too volatile to be used satisfactorily as an unpolymerised monomer.

The preferred system for use in this invention is an acrylic system initiated by a peroxide activated by an amine or metal compound and photoinitated by a catalyst such as acetophenone, anthraquinone, or benzophenone, a benzoin ether, benzil or derivatives thereof. These systems are rapid, reliable and of high strength. The invention is especially applicable to such a system but it is not limited to such a system.

The mechanisms of polymerisation by ultra-violet light and the hardening properties of pigmented ultra-violet light curable resins are discussed in detail in the prior literature.

Hird M. J. Journal of Coating Technology, 48, 75 1976
Hulme B. E. Journal of the Oil and Colour Chemists' Association, 59, 245 1976
Parrish M. A. Journal of the Oil and Colour Chemists' Association, 60, 44 1977.

The method of the present invention has a number of advantages over systems used hitherto for coating fasteners:

No solvents are used in the process of the invention thus avoiding health and safety hazards in application of the coatings. Film forming binders are not necessary as with conventional products, thus high ultimate strengths are achievable. Because aqueous emulsions are not used the drying ovens used with such products are not required. There is thus a saving in capital costs and in the costs of operation.

The cotaing process is very rapid and lends itself to high rates of production in commercial practice. One application of fluid followed by irradiation is all that is required. The photocurable fluid is the same fluid that is subsequently cured on assembly of the fastener by a different curing mechanism. Any of the photocured layer which is not physically removed on assembly can be further cross-linked by the second mechanism and therefore does not detract from the strength of the final seal.

It is unnecessary to clean or degrease fasteners before coating as the system can function adequately on greasy surfaces.

Since the cure system is liquid, the threads are fully flooded and no difficulty arises due to the presence of air in the interstices. The fastener system is therefore extremely reliable.

The method is applicable to concave and convex surfaces. It is therefore eminently suitable for nuts which are difficult to coat with conventional pre-applied coatings because of peeling of the coating on assembly.

BRIEF DESCRIPTION OF THE DRAWINGS

The method of the invention is illustrated in the accompanying drawings, in which.

Figure 1:
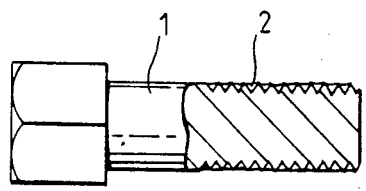
FIG. 1 is an elevation partly in section of a threaded fastener having a polymerisable fluid applied thereto.
Figure 2:
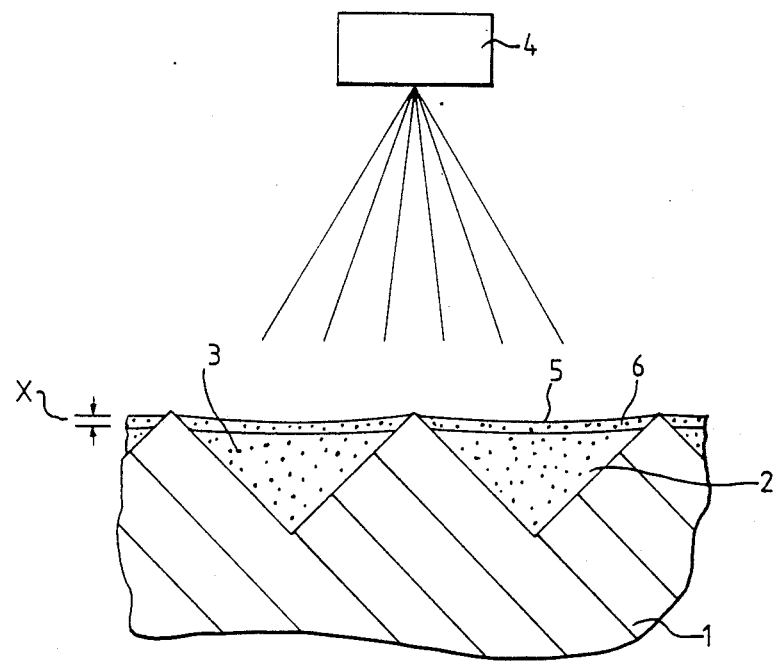
FIG. 2 is a diagrammatic cross section of the coating.

As seen in the drawings, a bolt 1 has a coating of the polymerisable fluid 2 applied thereto on the threaded portion of the bolt. The fluid 2 comprises an acrylic monomer having a microencapsulated peroxide initiator carried therein. For clarity, the microencapsulated initiator (which is of known type) is not shown in the drawings.

An opacifier 3 is dispersed throughout the fluid 2. The coated bolt is exposed to radiation from an ultra violet source 4 and the radiation impinges on the surface 5 of the coating. Due to the presence of the opacifier, the radiation only penetrates a short distance x into the fluid before it is extinguished. Polymerisation of the surface layer of fluid is initiated by the radiation and a dry crust or skin 6 is formed at the surface, having a depth x, which may suitably vary from 0.01–0.1 mm. Below this depth, the fluid is unaffected by the radiation and remains as a subcutaneous layer, ready for the second polymerisation to be initiated when the bolt 1 is mated with a nut.

DESCRIPTION OF THE PREFERRED EMBODIMENTS

A preferred class of polymerisable fluids is described in more detail below.

The monomer (A)

The polymerisable monomer is an acrylic or methacrylic ester of a monofunctional, difunctional or polyfunctional alcohol which is liquid at the working temperature.

The initiator (B)

The initiator is a free radical addition polymerisation catalyst which has a half life of at least 30 minutes at 85° C. A preferred such catalyst is benzoyl peroxide but other such free radical catalysts may be employed which will be recognisable to those skilled in the art.

The activator (C)

The activator is a tertiary amine, such as a substituted aniline, or a source of heavy metal such as copper, lead, iron, cobalt, manganese and the like, most desirably as an organo metallic compound or salt where the heavy metal is oxidisable, that is it is not in its highest oxidation state. Such compounds are exemplified by copper hexanoate, lead napthenate and cobalt octoate.

Photoinitiator (D)

The photinitiator is a compound such that it absorbs energy at a certain wavelength and in its excited state leads to the crosslinking of the polymerisable monomer. It initiates polymerisation through absorbtion of a photon in each growing step or through a chain process requiring a photochemical activation in each growing step. Among such initiators are benzoin ethers, benzil, anthraquinone, benzophenone or acetophenone or derivatives thereof or other agents such as described in the literature (G. G. A. Delzenne, Journal of Radiation Curing, Oct. 1979, p. 2).

The opacifier (E)

The opacifier is a finely divided powder which is opaque to the incident radiation. It can be a finely divided organic or inorganic solid such as a pigment or extender or a metal powder e.g. aluminium powder.

It can also be a dissolved material which absorbs ultra violet light such as 2-hydroxy-4-methoxy benzophenone and other derivatives of benzophenone and also other commercially available materials used as additives for the protection of polymeric materials from sunlight. To be effective they must be used in sufficient quantity so that the incident radiation is absorbed near the surface.

The invention is illustrated by the following Examples, in which percentages are given by weight based on the total composition.

The capital letters in parentheses following each component represent the appropriate category as described in the immediately preceding passage relating to a preferred class of polymerisable fluids.

Example 1 The formula used was as follows:

| | |
|---|---|
| Hydroxyethyl methacrylate | 73.0 (A) |
| Benzoyl peroxide microcapsules | 5.0 (B) |
| Dimethyl p. toluidine | 2.0 (C) |
| 2-Methyl anthraquinone | 2.0 (D) |
| Tioxide (Titanium dioxide pigment from British Titan Products Ltd.) | 10.0 (E) |
| Air floated silica (Tullanox 500 from Tulco Inc.) | 3.0 |
| Microcrystalline wax solution (2.5% in trichlorethane) | 5.0 |

The 2-methyl anthraquinone and dimethyl p. toluidine were dissolved in the monomer and the wax solution was added. The silica and titanium dioxide were dispersed in the solution by mechanical stirring. The benzoyl peroxide microcapsules were dispersed in the mixture by hand stirring. The finely divided silica is an adjuvant for suspending the microcapsules and achieving the desired viscosity so that the fluid will not run off the bolt surface.

The resulting mixture was applied to threaded bolts (M 10. Black oxide Grade 8.8) by dropping on the fastener which was held in a horizontal plane and rotated about its axis. The bolt was covered with a translucent hood through which nitrogen gas was passed. The rotating bolt was exposed to ultra-violet radiation from a high pressure mercury vapour lamp (Philips—H.P. 3202—output 300 watts) at a distance of 10 cms. for 1 minute. A skin formed on the surface of the coating. When the device was assembled using a steel nut, no resistance to hand assembly was discernible. On standing for 24 hours at ambient temperature the assembled fastener showed a breakaway strength of 8 Nm (average of 3 tests) when measured by torque wrench.

EXAMPLE 2

A commercially available methacrylate type anaerobic threadlocking fluid, Loctite 270, was modified by the addition of 10% aluminium powder, 2% benzophenone and 5% of a 2.5% microcrystalline wax solution in trichlorethane. The resulting fluid was dropped on threaded fasteners as before, rotating in a horizontal plane and exposed to ultra-violet light as in Example 1. The treated fasteners after assembly and standing for 24 hours showed a breakaway strength of 9 Nm (average of 3 tests) when measured by torque wrench.

The above compounded liquid was found to have a relatively low stability and gelled in the beaker within 24 hours.

EXAMPLE 3

The composition used was as follows:

| | |
|---|---|
| Ethoxylated bisphenol A dimethacrylate | 74.5 (A) |
| Hydroxyethyl methacrylate | 8.28 (A) |
| Benzoyl peroxide microcapsules | 4.14 (B) |
| N,N—Dihydroxy ethyl aniline | 0.25 (C) |
| Irgacure 651 (Dimethoxy-2 phenyl acetophenone available from Ciba Geigy AG) | 1.66 (D) |
| Tioxide | 6.21 (E) |
| Air floated silica (Tullanox 500) | 4.97 |

The resulting fluid was spread on threaded bolts ($M_{10}$) by rolling and treated as in Example 1. The fasteners showed a breakaway strength of 15 Nm 24 hours after assembly at room temperature.

EXAMPLE 4

The composition used was as follows:

| | |
|---|---|
| Hydroxyethyl methacrylate | 71.33 (A) |
| Benzoyl peroxide microcapsules | 5.00 (B) |
| N,N—Dihydroxy-ethyl aniline | 1.53 (C) |
| Irgacure 651 | 3.00 (D) |
| Cyasorb UV9 (2-hydroxy-4-methoxy benzophenone from American Cyanamid Co.) | 12.27 (E) |
| Air floated silica (Tullanox 500) | 6.11 |
| Helio fast yellow GXT (from Bayer A.G.) | 0.76 |

The fluid was spread on threaded bolts as before by rolling and the coated bolts exposed to the ultra violet radiation as before for 1 minute at a distance of 10 cms from the lamp in an atmosphere of nitrogen. The fasteners after 24 hours assembly at room temperature showed a breakaway strength of 9 Nm.

EXAMPLE 5

Threaded fasteners (degreased black M1O grade 8.8) were precoated with a thin coat of the following composition by spraying with an atomiser hand spray.

| | |
|---|---|
| Hydroxyethyl methacrylate | 82.0 (A) |
| Dimethyl aniline | 15.0 (C) |
| Irgacure 651 | 3.0 (D) |

The deposited thin coating was exposed to ultra-violet light as before in an atmosphere of nitrogen and hardened to a dry coat.

The coated fasteners were overcoated with a mixture of the following composition by rolling:

| | |
|---|---|
| Trimethylol propane trimethacrylate | 79 (A) |
| Benzoyl peroxide | 1.6 (B) |
| Irgacure 651 | 2.4 (D) |
| Aluminium paste (65% in white spirit)* | 12 (E) |
| Tullanox 500 | 5 |

*English Metal Powder Co. Ltd. (Empco Standard 65 leafing).

The benzoyl peroxide (which was not encapsulated) and Irgacure 651 were dissolved in the monomer and the Tullanox added with stirring on a mechanical stirrer. The aluminium paste was stirred in by hand. The coated fasteners were exposed to the lamp at a distance of 10 cms for 90 seconds and the coated fasteners were assembled with mating nuts. The base coat containing the amine activator was thereby mixed with the overcoat containing the peroxide initiator. The cure was very rapid so that quick assembly was required. After standing at ambient temperature for 24 hours the fasteners showed a breakaway strength of 8 Nm.

EXAMPLE 6

The fasteners used as before were coated with a base coat of the following composition by dipping and allowing to drain for 60 seconds:

| | |
|---|---|
| Hydroxyethyl methacrylate | 87 (A) |
| Benzoyl peroxide microcapsules | 10 (B) |
| Irgacure 651 | 3 (D) |

The base coat was hardened by exposure to ultra-violet radiation as before. The coated bolts were coated by rolling with a fluid of the following composition:

| | |
|---|---|
| Hydroxyethyl methacrylate | 77 (A) |
| Dimethyl p. toluidine | 5 (C) |
| Irgacure 651 | 3 (D) |
| Tioxide | 10 (E) |
| Tullanox 500 | 5 |

After exposure for one minute as before in an atmosphere of nitrogen a dry-to-touch coating was obtained. The fasteners on assembly and standing for 24 hours at ambient temperature showed a breakaway strength of 9 Nm.

EXAMPLE 7

The composition used was as follows:

| | |
|---|---|
| Polyethylene glycol dimethacrylate | 60.0 (A) |
| Atlac 382. (Propoxylated bisphenol A fumarate polyester from Imperial Chemical Industries Ltd.) | 10.0 (A) |
| Benzoyl peroxide microcapsules | 5.0 (B) |
| Dimethyl p. toluidine | 2.0 (C) |
| Irgacure 651 | 3.0 (D) |
| Calcium carbonate (precipitated) | 20.0 (E) |

The calcium carbonate was added with mechanical stirring to a solution of the Atlac resin in the methacrylate monomer. Bolts were coated by dipping and draining. Exposure was as before in an atmosphere of nitrogen. Because of the relatively low opacity of the calcium carbonate it was found necessary to reduce the exposure time to 20 seconds at 10 cms from the lamp. Longer exposures resulted in hardening of the film through its depth which prevented the assembly of the nut and bolt. The breakaway strength after 24 hours was 8 Nm.

EXAMPLE 8

The following compositions were prepared.

| | X | Y | |
|---|---|---|---|
| Hydroxyethyl methacrylate | 81.0 | 81.0 | (A) |
| Benzoyl Peroxide | 1.0 | | (B) |
| N,N—Diethoxy Aniline | | 1.0 | (C) |
| Irgacure 651 | 3.0 | 3.0 | (D) |
| Tullanox 500 | 5.0 | 5.0 | |
| Tioxide | 10.0 | 10.0 | (E) |

Fluid X was prepared by dissolving the benzoyl peroxide and the Irgacure in the methacrylate monomer and then dispersing the Tioxide and the Tullanox by mechanical stirring.

Fluid Y was prepared in a similar manner. The amine diethoxy aniline and the Irgacure were dissolved in the monomer and the Tioxide and Tullanox dispersed as before.

Fluid Y was spread on $M_{10}$ black bolts by rolling. The coating was exposed to the lamp at 10 cms. for 4 minutes in an atmosphere of nitrogen. A dry coating was obtained. Subcutaneous liquid was evident by rupture of the coating on one sample. The other samples were overcoated with fluid X by rolling and the coating again exposed to the lamp as before; again a dry crust was achieved (the longer than usual exposure times in this example may be due to a decrease in light emission efficiency of the lamp). The coated bolts on assembly with steel nuts and standing for 24 hours showed a breakaway strength of 10 Nm. (average of 5 bolts).

Benzoyl Peroxide Microcapsules

The benzoyl peroxide microcaps were made by coating a finely divided mixture of benzoyl peroxide and dicalcium phosphate with urea formaldehyde condensate. The mixture was prepared by dissolving 35 parts of benzoyl peroxide in acetone and adding 65 parts of finely divided dicalcium phosphate to the solution with stirring. The acetone was removed by evaporation and the solids dried in the air.

The encapsulation process was as described in British Pat. No. 989 264, 1965, to Minnesota Mining and Manufacturing Company.

I claim:

1. A polymerisable fluid for application as a pre-applied coating on at least one of two mating surfaces and for subsequently sealing and locking said two mating surfaces after assembly thereof, wherein the polymerisable fluid contains the following components which allow two mechanisms for the initiation of polymerisation, a first of the mechanisms being initiatable by radiation:

(a) at least one free radical curable monomer or oligomer
   (b) a photoinitiator capable of initiating the first mechanism to initiate polymerisation of the said monomer or oligomer upon exposure to ultraviolet or visible radiation
   (c) a second free radical polymerisation initiator capable of initiating the second mechanism to initiate polymerisation of said polymer or oligomer
   (d) an activator for the initiator (c), said second initiation mechanism being inhibited from activation by exposure to ultraviolet or visible radiation but being initiatable as a consequence of assembly of said two mating surfaces and
   (e) an opacifier which has the capacity to obstruct the transmission of the radiant energy of the said polymerisation initiating radiation to the extent that the radiation incident on a surface of the fluid in said pre-applied coating is extinguished near the said surface and initiates polymerisation by said first mechanism only in a surface layer of the fluid to form a dry-to-touch crust thereon while the fluid beneath the crust remains in a fluid state ready for polymerisation by said second mechanism upon assembly of said two mating surfaces.

2. A polymerisable fluid according to claim 1, wherein the first initiation mechanism is initiatable by ultraviolet radiation.

3. A polymerisable fluid according to claim 2, wherein the initiator for the first initiation mechanism is benzophenone, anthraquinone, acetophenone, a benzoin ether or benzil, or a derivative thereof.

4. A polymerisable fluid according to claim 1, wherein the opacifier is a finely divided solid.

5. A polymerisable fluid according to claim 4, wherein the opacifier is a pigment or a metal powder.

6. A polymerisable fluid according to claim 1, wherein the polymerisable fluid contains a liquid acrylic or methacrylic ester, a vinyl or allyl ether, a vinyl or allyl ester, styrene or a substituted styrene, which is polymerisable by the radiation-initiated mechanism and also by another free radical addition polymerisation mechanism.

7. A polymerisable fluid according to claim 1, wherein the first polymerisation mechanism is initiatable by visible radiation.

8. A polymerisable fluid according to claim 1, wherein the opacifier is a soluble organic material which acts as an absorber of ultra-violet light.

9. A polymerisable fluid according to claim 1, wherein the second initiation mechanism is inhibited by isolating one or more of the active ingredients (c) and (d) from the remainder of the fluid.

10. A polymerisable fluid according to claim 9, wherein one or more of the said active ingredients is isolated in a rupturable film or coat or in microcapsules.

11. A polymerisable fluid according to claim 1, wherein the second of the initiation mechanisms is an anaerobic system which is inhibited in the presence of oxygen.

12. A polymerisable fluid for application as a pre-applied coating on at least one of two engineering parts and for subsequently sealing and locking two said engineering parts after assembly thereof, wherein the polymerisable fluid contains the following components which allow two mechanisms for the initiation of polymerisation:

(a) at least one free radical curable monomer or oligomer (b) a photoinitiator capable of initiating the first mechanism for initiation of polymerisation of the said monomer or oligomer upon exposure to ultra-violet or visible radiation (c) a second free radical polymerisation initiator capable of initiating the second mechanism for the initiation of polymerisation of said polymer or oligomer (d) an activator for the initiator (c), one of the active ingredients (c) and (d) for the second initiation mechanism being microencapulated or the second initiation mechanism being an anaerobic system and (e) an opacifier which has the capacity to render the fluid opaque to the said polymerisation initiating radiation to the extent that the radiation incident on a surface of the fluid in said pre-applied coating initiates polymerisation by said first mechanism only in a surface layer of the fluid to form a crust thereon while the fluid beneath the crust remains in a fluid state ready for initiation of polymerisation by said second mechanism upon assembly of said two engineering parts.

* * * * *